July 4, 1967 R. A. CLARK, JR 3,329,779

TIMER UNITS FOR PLURAL ZONE, PRE-PAY TELEPHONE STATIONS

Original Filed Feb. 20, 1961 8 Sheets-Sheet 1

Inventor:
Robert A. Clark, Jr.,
by Thos. A. Banning, Jr.
Atty.

TIMER UNITS FOR PLURAL ZONE, PRE-PAY TELEPHONE STATIONS

Original Filed Feb. 20, 1961 8 Sheets-Sheet 2

Inventor:
Robert A. Clark, Jr.,
by Thos. A. Banning Jr.
Atty.

July 4, 1967 R. A. CLARK, JR 3,329,779

TIMER UNITS FOR PLURAL ZONE, PRE-PAY TELEPHONE STATIONS

Original Filed Feb. 20, 1961 8 Sheets-Sheet 3

Inventor:
Robert A. Clark, Jr.,
by [signature]
Atty.

TIMER UNITS FOR PLURAL ZONE, PRE-PAY TELEPHONE STATIONS

Inventor:
Robert A. Clark, Jr.,
by Thos. R. Browning, Jr.
Atty.

Inventor: Robert A. Clark, Jr., by [signature] Atty.

July 4, 1967 R. A. CLARK, JR 3,329,779

TIMER UNITS FOR PLURAL ZONE, PRE-PAY TELEPHONE STATIONS

Original Filed Feb. 20, 1961 8 Sheets-Sheet 6

Inventor: Robert A. Clark, Jr.,
by Thos. [signature] Atty.

TIMER UNITS FOR PLURAL ZONE, PRE-PAY TELEPHONE STATIONS

Original Filed Feb. 20, 1961 8 Sheets-Sheet 7

Inventor:
Robert A.Clark,Jr.,
by Thos. L. Lancing Jr. Atty.

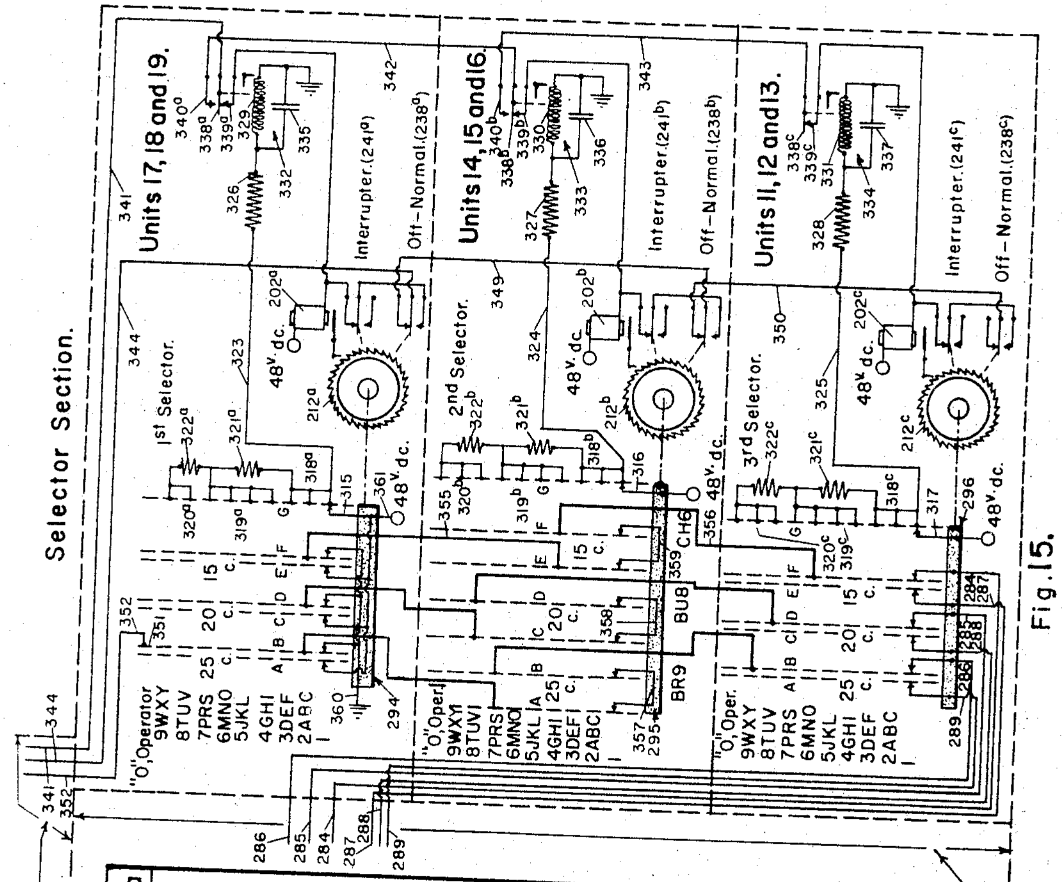

Fig. 15.

Strapping Schedule.

| 10 Cent Area X | 15 Cent Area | 20 Cent Area | 25 Cent Area |
|---|---|---|---|
| AM2-262 | AR1-271 | AR6-276 | AT5-285 |
| AU7-287 | AV2-282 | AV6-286 | BA1-221 |
| BE3-233 | BE7-237 | BI2-242 | BI7-247 |
| BO3-263 | BO8-268 | BU1-281 | CA6-226 |
| CA8-228 | CE6-236 | CH3-243 | CL4-254 |
| CO1-261 | CO7-267 | CR7-277 | DA6-326 |
| DE2-332 | DE7-337 | DO3-363 | DR3-373 |
| EA7-327 | EO4-334 | ES5-375 | ES9-379 |
| EV4-384 | FA4-324 | FI6-346 | FR2-372 |
| FR6-376 | GR6-476 | HA1-421 | HA7-427 |
| HE4-434 | HE6-436 | HI5-445 | HO5-465 |
| HU3-483 | HU9-489 | HY3-493 | IN3-463 |
| IR8-478 | JU3-583 | JU8-588 | KE6-536 |
| KE8-538 | KI5-545 | LA2-522 | LA5-525 |
| LI8-548 | LI9-549 | LO1-561 | LU2-582 |
| LU5-585 | MA6-626 | ME7-637 | MI2-642 |
| MI3-643 | MO4-664 | MO6-666 | MU5-685 |
| MU4-684 | NA2-622 | NA5-625 | NE2-632 |
| NE8-638 | NO7-667 | OA4-624 | PA5-725 |
| PE6-736 | PL2-752 | PO7-767 | PR6-776 |
| PR9-779 | PU5-785 | RA3-723 | RA8-728 |
| RE1-731 | RE7-737 | SA1-721 | SA2-722 |
| SE3-733 | SE8-738 | SH3-743 | SO8-768 |
| SP4-774 | SP7-777 | ST2-782 | ST1-781 |
| SU4-784 | SU7-787 | TA9-829 | TR3-873 |
| TR4-874 | UN8-868 | VA6-826 | VI2-842 |
| VI7-847 | WA4-924 | WA8-928 | WE4-934 |
| WE5-935 | WH3-943 | WH5-945 | BR9-279 |
| | CH6-246 | BU8-288 | |

Note: X designates no strapping used.

Fig.

Inventor:
Robert A. Clark, Jr., by [signature] Atty.

United States Patent Office 3,329,779
Patented July 4, 1967

3,329,779
TIMER UNITS FOR PLURAL ZONE, PRE-PAY TELEPHONE STATIONS

Robert A. Clark, Jr., Fort Lauderdale, Fla. (% Communication Equipment and Engineering Co., 5646 W. Race St., Chicago, Ill. 60644)

Original application Feb. 20, 1961, Ser. No. 99,976, now Patent No. 3,221,101, dated Nov. 30, 1965. Divided and this application Mar. 29, 1965, Ser. No. 443,252
11 Claims. (Cl. 200—37)

ABSTRACT OF THE DISCLOSURE

A timer unit for timing telephone calls and the like, intended for use in connection with telephone systems wherein provision is made for dialing telephones in a plurality of zones, wherein the base charges for calls to such zones differ, so that the rate per minute of call, including overtime of calls, differ for such zones; with provision for delivering timed signals for payment for overtime calls, on the basis of the rate per minute for the zone of which overtime is being measured.

This invention relates to improvements in timer units for plural zone, pre-pay telephone stations, and the like.

This application is a division of my co-pending application of patent on improvements in plural zone, time control, pre-pay telephone systems, and the like, Ser. No. 99,976, filed Feb. 20, 1961. In order to better understand various features of structure and operations thereof, to be hereinafter illustrated and described, I shall first state briefly some of the operations and purposes thereof, which are disclosed in the parent application, relating to the complete telephone pre-pay station therein disclosed, of which complete station the timers to which this application relates, comprise elements; thus also showing some of the purposes and uses of functions and structures of the timers themselves. In so doing, however, it will be understood that timers embodying such functions and structures as will be hereinafter disclosed, may also be used in connection with operations, and for purposes other than those specific to the pre-pay telephone stations disclosed in and covered by my aforesaid application, Ser. No. 99,976; and that I do not limit myself to the specific uses and combinations disclosed in that parent application, except as I may do so in the claims to follow.

In a plural zone, time control pre-pay telephone system embodying features disclosed in my said parent application, provision is made for calling parties located in several zones which zones generally surround the calling station, and are located at progressively greater distances from such calling station. The base pay for calling a party in each of such zones is determined generally according to the distance of such called party from the calling station; so that the base charges or pays to call parties in the several zones so serviced, are generally proportioned to the distances of the called parties from the calling station. As an example, provision may be made for servicing called stations lying in three zones located at successively greater distances from the calling station. These may conveniently be defined as zones "A," "B" and "C." The base charges or pays to call stations lying in such zones may, for example, be fifteen cents, twenty cents, and twenty-five cents.

Conveniently also, the base time intervals pre-paid for calls to such zones, may all be the same, for example, five minutes; the base charge for each zone pre-paying for a completed call covering such base time interval without need of further payment. Simple division then shows that the charge per minute of base pay call is 3 cents in the case of zone "A," 4 cents in the case of zone "B," and 5 cents in the case of zone "C."

Provision has been made, in the disclosures of such parent application, and in the timer unit disclosed therein, which timer unit is the subject-matter of the present divisional application, for extending the timer operation beyond the base pay time interval, by proper over-time payments made at a suitable unit of the station. It is convenient and desirable to make provision for extending the pay time call, if desired by the calling party, by use of coins of convenient denomination, successively inserted into a coin receptacle. Preferably also, it is desirable that coins of the same denomination be used for each of a succession of pre-pay extensions, and that extensions of pre-paid time for all of the zones be made by coins of one and the same denomination, for example, a nickel (5 cents). It will be evident that deposit of a 5 cent extension when calling a zone "A" station should result in production of a greater time extension than would deposit of such 5 cent coin when calling a zone "B" station; and that such deposit of such 5 cent extension when calling a zone "B" station should result in production of a greater time extension than would deposit of such 5 cent extension coin when calling a zone "C" station. This relation of the proper time extensions for calling stations located in the different zones may be further evidenced by the following comparison:

When the charge per minute of base pay is 3 cents (being the illustrated case for zone "A"), corresponding to the base pay of fifteen cents for 5 minutes, it is evident that, at the rate per minute of extension the same as the rate per minute of base time interval, a 5 cent extension must produce, in the timer, proper responses to enable continuing the conversation for 5/3 minutes, or 1.66 minutes. Correspondingly, for the case of zone "B" (as to which the base pay is twenty cents for a time interval of five minutes), a 5 cent extension must produce, in the timer, proper responses to enable continuing the conversation for 1.25 minutes; and in the case of zone "C" (as to which the base pay is twenty-five cents for a time interval of five minutes), a 5 cent extension must produce, in the timer, proper responses to enable continuing the conversation for 1.00 minute. It is thus evident that, when using coins of a single selected value for producing extensions of the pre-pay time interval under the conditions of different base pay amounts for the different zones, provision must be made in the timer for delivering desired signals after extended time intervals of amount depending upon and corresponding to the rate per minute demanded for the zone being called, such rates per minute for the several zones differing from each other. Provision has been made in the timer structures hereinafter disclosed, for producing the foregoing desired results. The signals delivered at termination of the extended time intervals (or at termination of the originally paid, base pay-time interval) may be used for control of other elements of circuitry or otherwise. Such other elements are herein disclosed to facilitate explanation and understanding of various of the timer structures and their functions and relations to each other.

A further feature of the present invention concerns itself with the provision of a simple arrangement for producing the time measured signals, both for termination of the base pay time interval (if no extension has been paid), and for termination at conclusion of whatever time extensions have been paid, including provision for delivering such termination signals according to the time rate of the zone for which completion of the call has been delivered. In this connection, provision is also made for conditioning output terminals to deliver signals of completion of the paid time intervals, including extension intervals, for the several zone rates, which output terminals may be connected to other circuitry of the telephone station; so that the output terminals for connection to such other telephone circuitry shall be electrified progressively for each zone, and according to the paid extension of extensions which have been made for such zone, on the basis of the rate per minute demanded for such zone.

In connection with the foregoing, a further feature and object of the invention relates to a very simple structure for producing the time counting operation. This structure includes a contact carrier which, when the timer operation has been commenced, will be advanced at uniform speed during the time counting operation. Such contact carrier carries wiper contacts corresponding to the several zones being serviced, and which wiper contacts are connected to the other output terminals of the timer, which output carrier terminals are connected to the other elements of the telephone circuitry; the wiper contacts of the carrier progressively engaging stationary contacts of the timer, which stationary contacts are in turn electrified selectively, according to a selector stepping switch which is advanced to positions depending upon the insertion of extension payments made from time to time during the continuation of the completed call. Thus the timer itself is so constituted that it will deliver a time termination signal at conclusion of the paid time for the zone to which the call is being made, including any extension time, and according to the rate of charge per minute from the calling station to the zone which includes the called station.

Provision is also made for delivering a warning signal a predetermined time in advance of the expiration of the paid time (including any extensions), to enable the calling party to make a further extension payment of one or more coins of the proper value, with corresponding extension of the setting of the selector stepping switch to electrify the stationary contacts corresponding to the extended total paid time interval.

The uniform speed of advance of the contact carrier is produced by a small constant speed motor which is energized by supply of current when the call has been completed by the response of the called party, a simple form of clutch being interposed between the motor output shaft and the contact carrier, such clutch being normally disengaged so that normally the contact carrier will be returned to its home or starting position by suitable returning means, such as a spring provided for the purpose. Provision is made for causing the clutch to engage the contact carrier element for drive in the time counting direction when the motor is electrified.

Other objects and uses of the invention will appear from a detailed description of the same, which consists in the features of construction and combinations of parts hereinafter described and claimed.

In the drawings:

FIGURE 1 shows a top plan or face view of the timer unit, with the swinging contact carrier fully restored to its base or zero time position by spring retraction, presently to be explained; and the timer unit shown includes stationary contacts corresponding to a fifteen cent zone, a twenty cent zone and a twenty-five cent zone; and the swinging contact carrier carries contacts, corresponding to all three such zones, and for producing the warning signal and also for producing the final cut-off signal;

FIGURE 2 shows an edge view corresponding to FIGURE 1, but looking at the edge of the unit which is at the top of FIGURE 1, so that the right hand edge of FIGURE 2 corresponds to the left-hand edge of FIGURE 1, and the left-hand edge of FIGURE 2 corresponds to the right-hand edge of FIGURE 1; it being here noted that various of the operating elements of this timer are supported from a plate beneath and connected to the top or contact carrying plate of the timer;

FIGURE 3 shows a bottom face view of the timer unit, being a face view produced by rotation of the showing of FIGURE 2 about an axis extending across FIGURE 2, horizontally, and with rotation through 180 degrees; and FIGURE 3 shows the stepping switch element which is advanced step-by-step corresponding to additional money insertions into the coin receiving unit and according to the denominations of such money insertions, the successive contacts of such switch being connected to the successive stationary contacts shown in FIGURE 1; and FIGURE 3 also shows the time count, uniform speed motor, by which time is counted; together with the clutch element by which such motor's drive is communicated to the swinging contact carrying arm to advance such arm, during count of time, by motor drive, and against the urge of a retracting spring, with clutch release at completion of the time count, to permit the arm to be returned to its initial or base position, shown in FIGURE 1;

Figure 2:
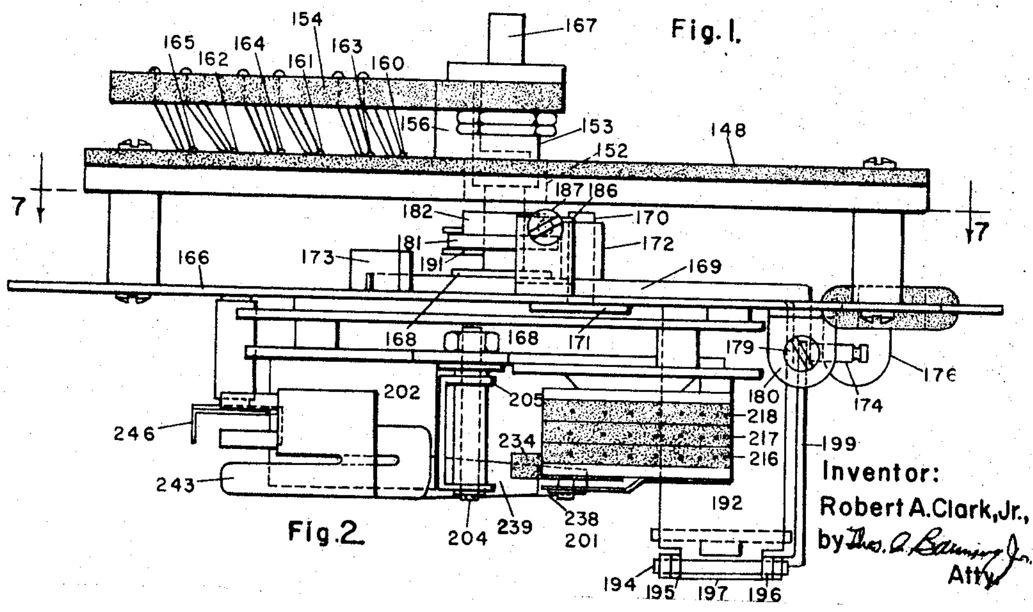
Figure 4:
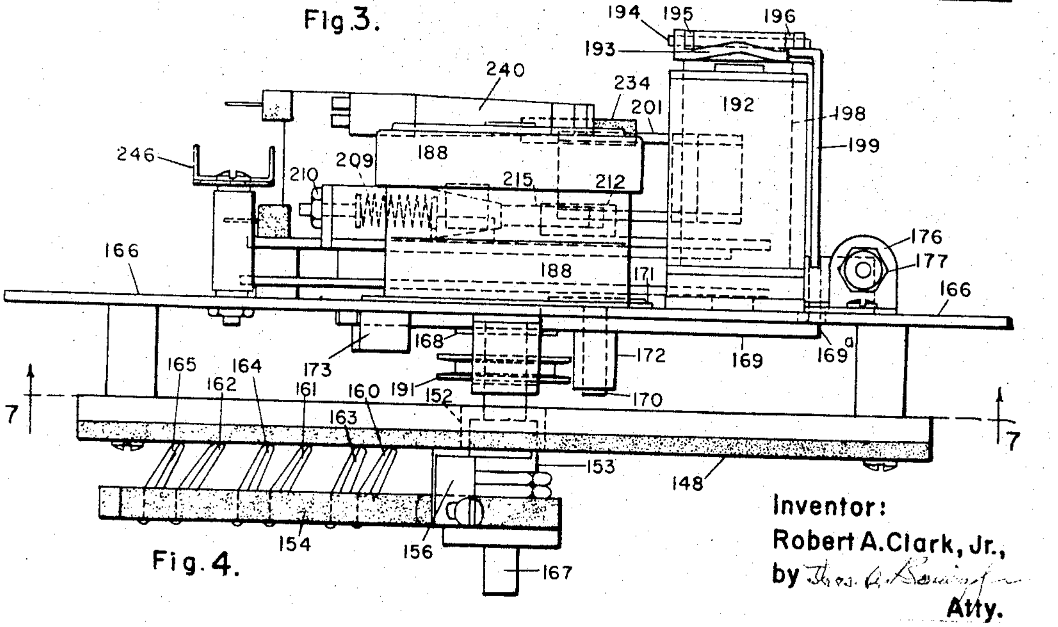
FIGURE 4 shows an edge view corresponding to FIGURE 3, looking towards the lower edge of the unit shown in FIGURE 3.
Figure 5:
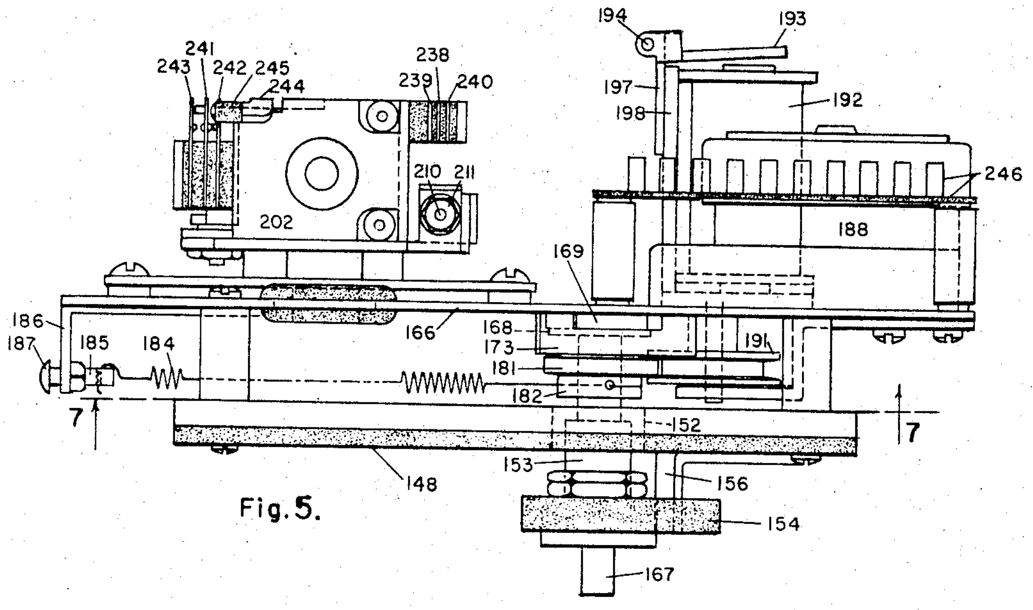
FIGURE 5 shows a left-hand edge view corresponding to FIGURE 3.
Figure 6:
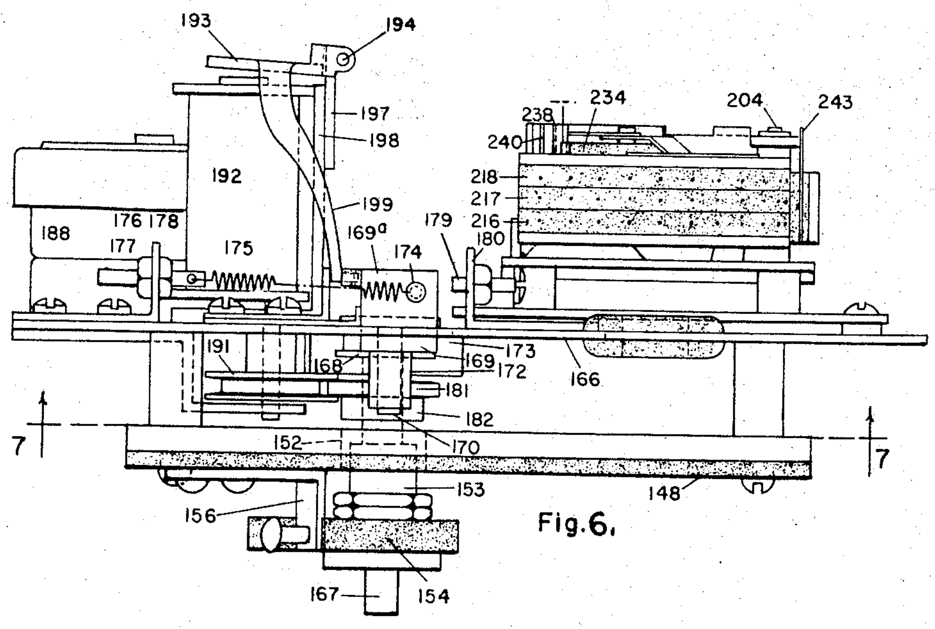
FIGURE 6 shows a right-hand edge view corresponding to FIGURE 3.
Figures 7, 8, 9, 10, 11:
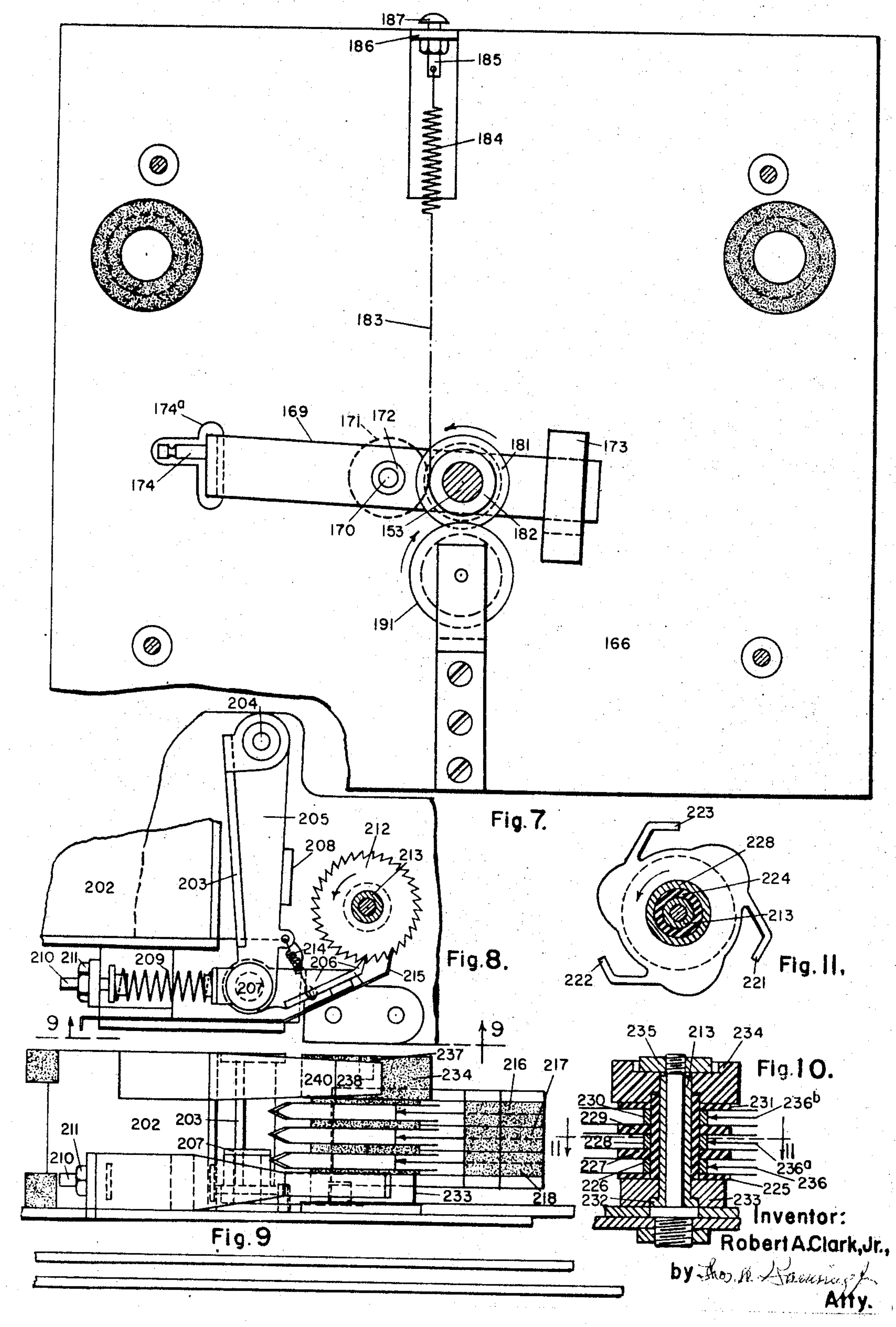
Figure 12:
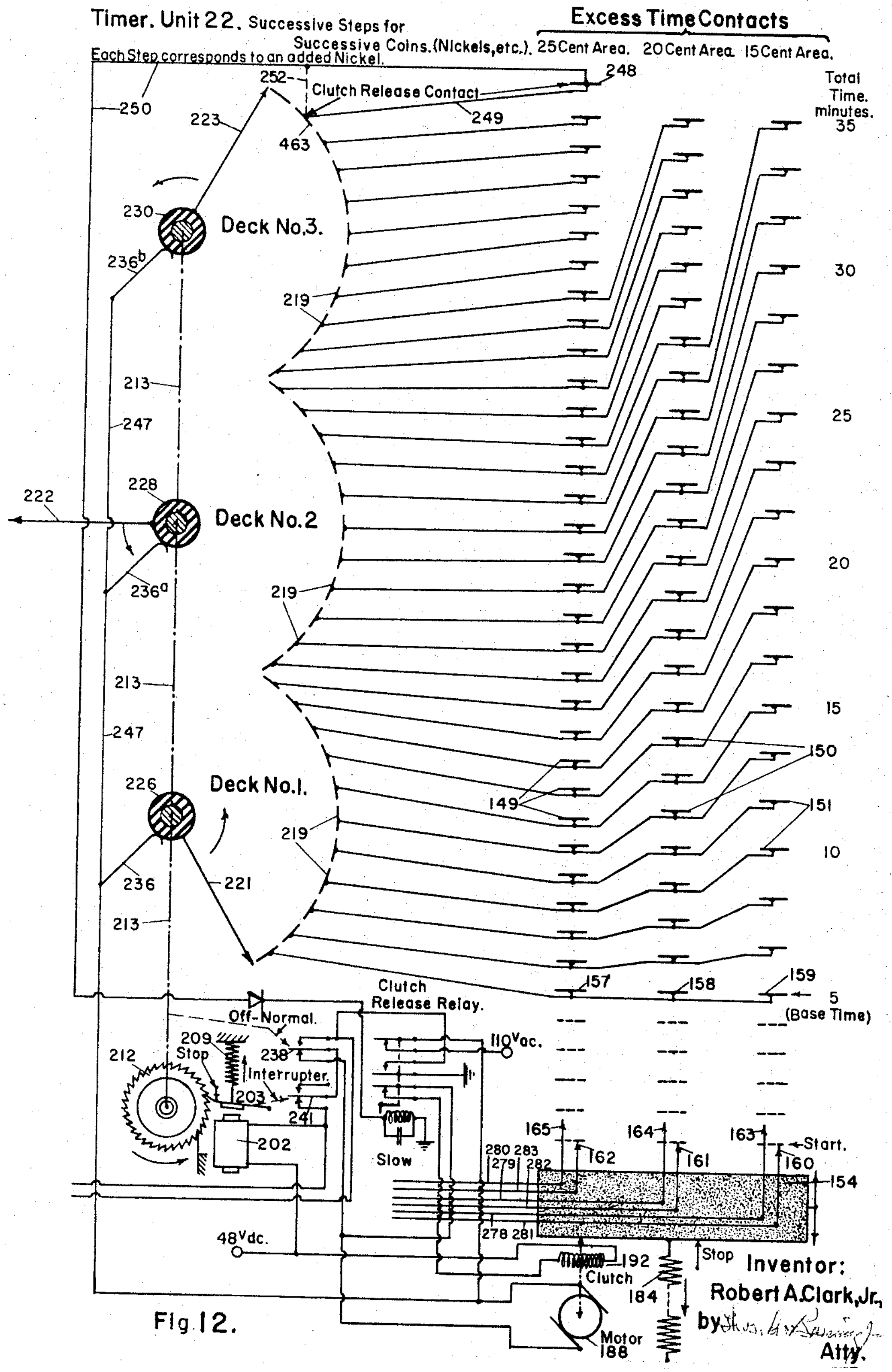

FIGURE 7 shows a horizontal section, looking down, taken on the line 7—7 of FIGURE 2, looking in the direction of the arrows; and FIGURE 7 is also a horizontal section, looking upwardly, taken on the lines 7—7 of FIGURES 4, 5 and 6; and FIGURE 7 shows the rock arm which carries the stub shaft by which the swinging arm is carried; such rock arm and stub shaft being capable of slight back and forth shift between a normally unclutching position and a clutching position in which the swinging arm is driven and rocked during the time count interval;

FIGURE 8 shows a fragmentary plan view of the ratchet drive and hold-back elements, by which the stepping switch is advanced step-by-step according to pulses delivered by and corresponding to successive coins introduced into the coin receiving unit; FIGURE 8 being on enlarged scale as compared to other views of the timer unit;

FIGURE 9 is a fragmentary detail elevation taken on the line 9—9 of FIGURE 8, looking in the direction of the arrows;

FIGURE 10 is a fragmentary vertical section through the central or shaft portion of the stack of contact decks and corresponding movable contacts, of the stepping switch shown in various figures, including FIGURES 8 and 9;

FIGURE 11 is a fragmentary horizontal section taken on the line 11—11 of FIGURE 10, looking down, in the direction of the arrows; and FIGURE 11 shows the three wiper contacts corresponding to the three decks of stationary contacts, which three wiper contacts engage corresponding deck stationary contacts in sequence, each sequence of engagement of a wiper contact occurring through approximately one-hundred-twenty degrees of advance of the wiper contacts;

FIGURE 12 shows in schematic form the relationships of the principal operating elements of the timer contact system, including the stationary contacts, the movable (rockable) contact carrying arm, the drive motor and clutch for driving such contact arm at uniform rate during the time counting interval, the stepping switch advancing ratchet and pawl arrangement, for producing stepping, the three wiper contacts for the three decks, the "interrupter contacts" for advancing the stepping switch by a self-pulsed operation to restore the wipers to their normal or zero positions when a time counting operation has been completed; and the "Off-Normal" contacts which modify circuitry as soon as the stepping switch moves forward from its normal or zero position, and for restoring such circuitry at final return of the wipers to their normal or zero positions and FIGURE 12 shows stationary contacts corresponding to insertion of coins of successive equal denominational values for successive extra time intervals of equal time values, the successive stationary contacts for the three zones (fifteen cent, twenty cent and twenty-five cent) being progressively spaced to correspond to the respective extra time values for such extra time coin insertions.

Figure 13:
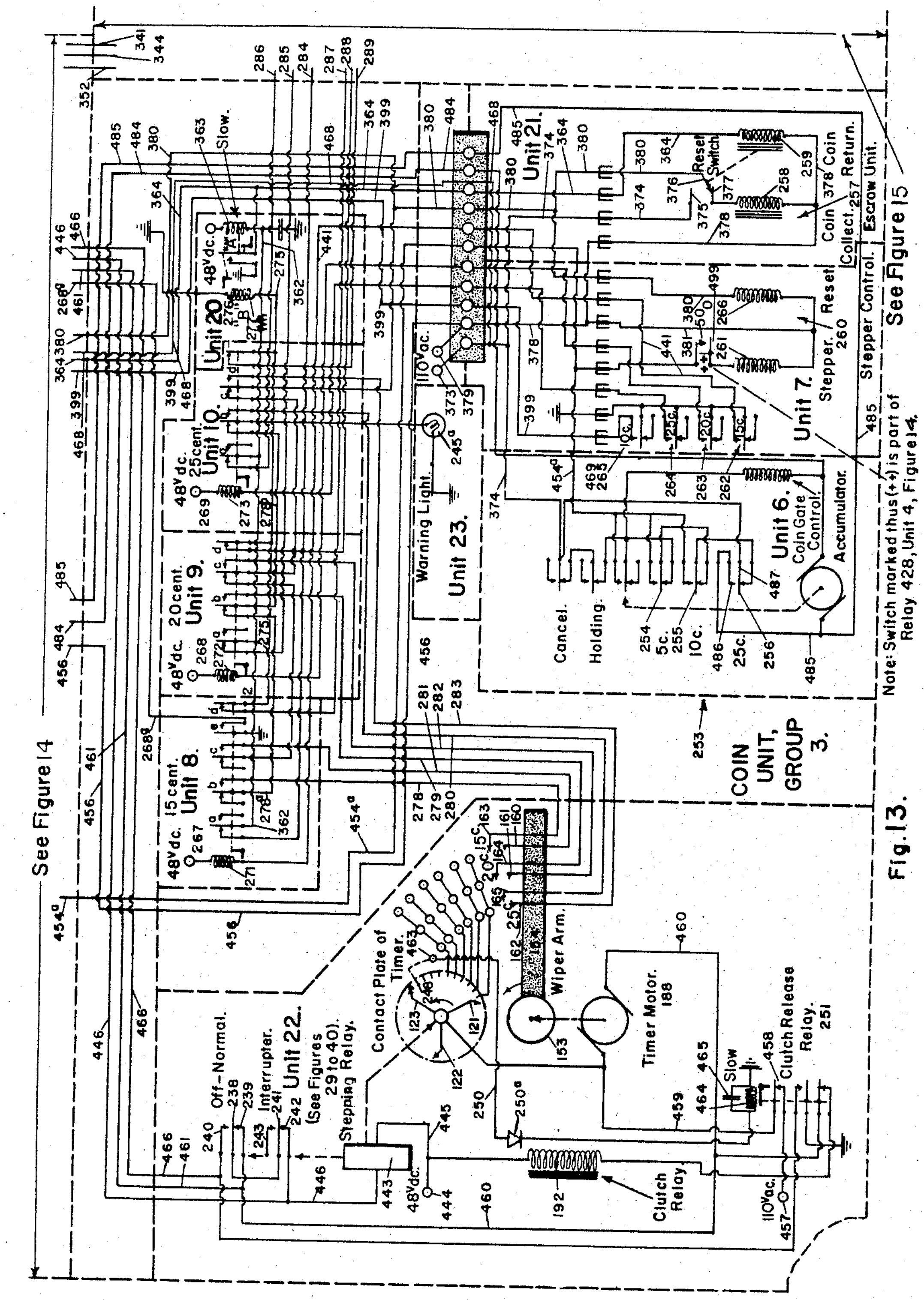
Figure 14:
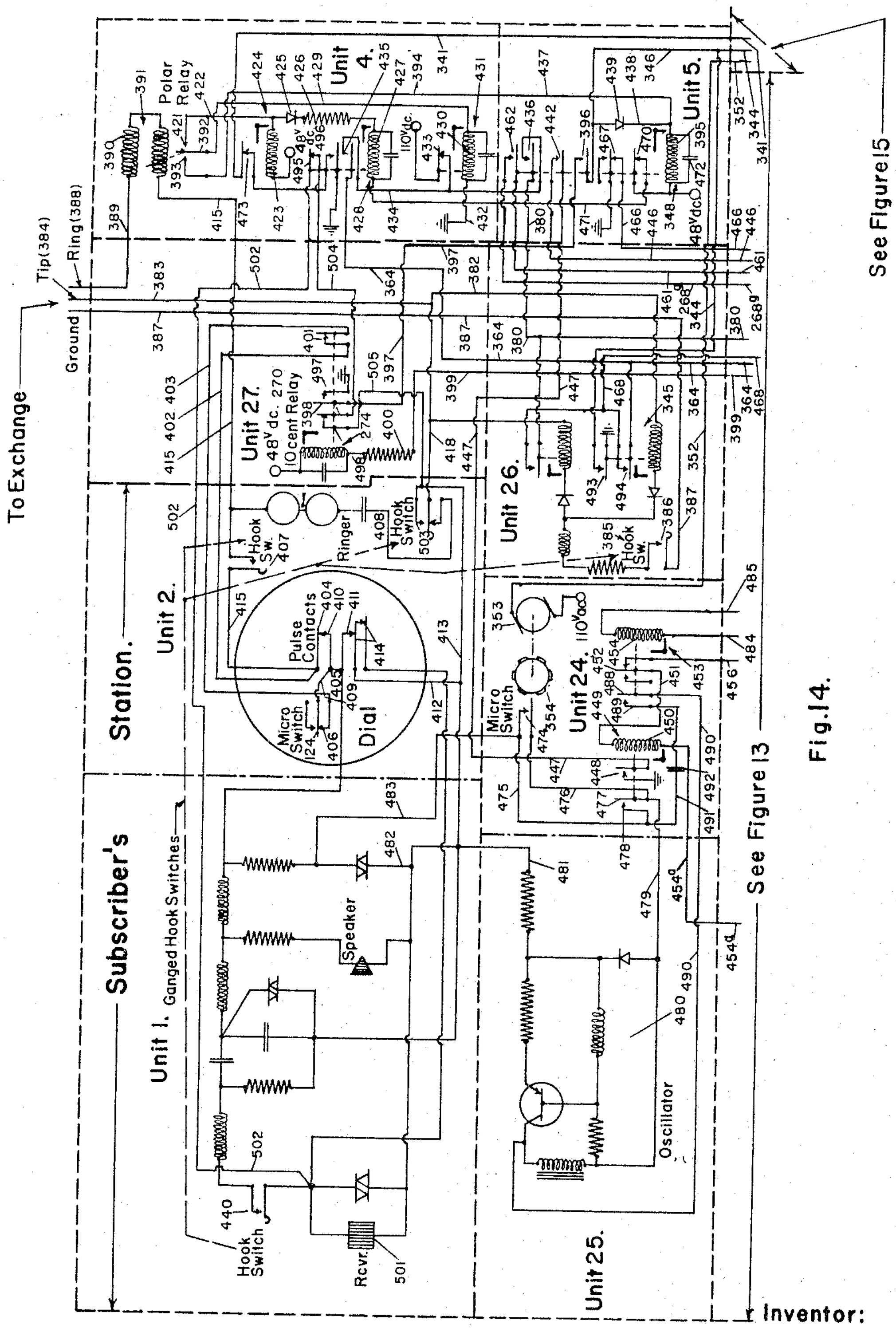

FIGURE 13 shows a portion of a wiring diagram for the circuitry of a pre-pay, plural zone, time control calling station which includes a timer unit embodying the features of invention comprising the disclosures of the present application; this portion of such wiring diagram including a schematic showing of the timer elements and portions of the timer circuitry, together with connections between various of the time elements already described, and other calling station units; the present FIGURE 13 comprising that portion of the calling station circuitry below FIGURE 14 and to the left of FIGURE 15;

FIGURE 14 shows that portion of the calling station wiring diagram above the showing of FIGURE 13; and FIGURE 15 shows that portion of the calling station wiring diagram to the right of the showing of FIGURE 13.

It will be understood that the calling station of which the wiring diagram sections are shown in FIGURES 13, 14 and 15, including the timer embodying the features of the present invention, is herein illustrated primarily to facilitate the understanding of the timer structures of the present case, and to show operative connections between various elements of such timer and other elements of circuitry or apparatus, from and to which signals affecting the timer operations, or delivered by the timer, flow; and also to show various interconnections between elements of the timer itself, and which may be considered as "internal" to such timer. In thus illustrating one particular circuitry and set of units other than the timer itself, I do not intend to limit myself, except as I may do so in the claims to follow. Detailed description of the timer unit:

The timer unit is provided with a movable element which carries at least one movable contact corresponding to each of the zones to be served. This is a primary or operation terminating contact. Preferably, also each such movable elements carries another secondary contact for each zone. This secondary contact is so disposed that it effects a circuit closing operation a predetermined time interval prior to the closing function produced by the corresponding primary contact for the zone in question.

This timer also carries a series of stationary contacts for each zone mounted in position for successive engagement by the movable contact or contacts for such zone; and when both a primary and a secondary contact are provided for each zone, they are so mounted on the movable element or carrier that the secondary contact for each zone will engage a specified stationary contact for such zone at a pre-determined warning time interval prior to engagement of such specified contact by the primary contact for such zone. Conveniently, such pre-determined time interval is chosen as 45 seconds, being a warning time within which the calling party may, if desired, make pre-payment for an extended time interval of his call. If such further payment is made the permitted interval will be extended an amount corresponding to such additional pre-payment. At the warning time interval prior to expiration of such extended interval a new warning signal will be given; and the calling party may make further pre-payment for a further extension of time. Otherwise, in case no extension pre-payment is made, either as first explained above, or as secondly explained above, the call will be cut off by functions instituted by engagement of the primary movable contact for such zone, with the stationary contact which corresponds to the original pre-paid time interval or the extended pre-paid interval, as the case may be.

Conveniently, the movable contact carrying element comprises an arm secured to and carried by a rock shaft, so that such arm sweeps over a stationary contact carrying element during the time count operation. Such arm carries the primary and secondary contacts for the several zones, at successive radial positions outwardly along such arm; and the stationary contacts for the several zones are located in or on the contact carrying element in circular segments co-axial with the rock shaft, within a slight departure from such co-axial condition during normal operations, as will presently appear.

Means are provided for driving the rock shaft, during a time count operation, at uniform rate from the zero or normal position of the rock shaft (and connected arm), thus causing the movable contacts for the several zones to successively engage the stationary contacts for their respective zones, during the continued rocking and arm sweeping operation. During this operation the secondary contact for each zone engages any given stationary contact for such zone at the pre-determined interval prior to engagement of such stationary contact by the primary contact for such zone; and the engagements for the respective primary contacts with the successive stationary contacts for their zones occur after discontinuance of engagements of such stationary contacts by the secondary contacts with the corresponding primary contacts. Thus there is avoided circuitry interference between the signals produced by the engagements of the secondary contacts and the corresponding primary contacts, with the successive stationary contacts.

Conveniently the stationary contacts for each zone are spaced progressively from each other at uniform spacings, corresponding to successive and equal time intervals. With this arrangement, each secondary contact, and each primary contact for the respective zones, will engage a succeeding stationary contact at a time interval uniform for all such successive stationary contacts for such zones. Then, if the extra pre-pay amounts for successive extra time intervals are of equal values for any given zone, it follows that by making successive pre-payments of equal amounts for successive extra time intervals, a proper relationship between the stationary contacts and such successive extra time intervals will be ensured. For example, if the pre-pay charge per minute for the twenty-five cent zone is five cents, then it follows that successive pre-payments of five cents each, must correspond to engagement of successive stationary contacts for the twenty-five cent zone, at intervals of one minute each. Likewise, if the pre-pay charge per minute for the twenty cent zone is four cents, then it follows that successive pre-payments of five cents each, must correspond to engagement of successive stationary contacts for the twenty cent zone, at intervals of one and one-quarter minute each; and if the pre-pay charge per minute for the fifteen cent zone is three cents, then it follows that successive pre-payments of five cents each, must correspond to engagement of successive stationary contacts for the fifteen cent zone, at intervals of one and two-thirds minutes each. Under this basic relationship, by making provision for successive advancements of a stepping switch, by steps which correspond to successive nickels introduced into the coin receiving unit, successive contacts of such stepping switch may be successively electrified. Then, by connecting each such stepping switch contact with one of the stationary contacts of the twenty-five cent zone, and with one of the stationary contacts of the twenty cent zone, and with one of the stationary contacts of the fifteen cent zone, it follows that, although the twenty-five cent contact just referred to is spaced ahead of the previous twenty-five cent contact by a spacing corresponding to one minute of movement of the rock shaft and movable contact carrying arm, the twenty cent contact of such so-connected group should be spaced ahead of the previous twenty cent contact by a spacing corresponding to one and one-quarter minute of movement of such rock shaft and arm, and the fifteen cent contact of such so-connected group should be spaced ahead of the previous fifteen cent contact by a spacing corresponding to one and two-thirds minutes of movement of such rock shaft and arm. This spacing relationship between sucessive stationary contacts of the twenty-five cent zone group, and of the twenty cent zone group, and of the fifteen cent zone group, must be maintained for the full range of time movements of the rock shaft and the arm, for which provision has been made.

Conveniently, a base time of five minutes is provided for each of the three zones, corresponding, in the three cases, to a base charge of twenty-five cents, a base charge of twenty cents for the twenty cent zone, and a base charge of fifteen cents for the fifteen cent zone. Under this arrangement, it is unnecessary to provide any of the stationary contacts for the three zones until the five minute position of the rock shaft and arm is reached, at which position the first stationary contact for each of the three zones is located. Thereafter successive step contacts of the stepping switch are connected to successive groups of the stationary contacts, according to the relationship already explained. Under this arrangement, also, if the timer is designed to provide for a maximum of thirty minutes of extra time, by extra pre-payments, corresponding to thirty-five minutes from the starting position, it is evident that such thirty-five minute time lapse (including a maximum of thirty minutes of extra time) will require the insertion of $1.50 extra pre-pay money, in the case of the twenty-five cent zone, will require the insertion of $1.20 of extra pre-pay money, in the case of the twenty cent zone, and will require the insertion of $0.90 of extra pre-pay money, in the case of the fifteen cent zone, corresponding to 18 steps of the stepping switch. It will presently appear that provision has been made for producing one pulse for operation of the stepping switch, corresponding to each five cents of pre-pay money, whether such pre-pay be the original payment for the base time, or a pre-pay for extra time. Thus, insertion of a dime into the coin receiving unit will produce two pulses for delivery of corresponding pulsed steps to the stepping switch.

The primary and secondary contacts carried by the sweep arm are connected, by means of suitable connections, such as flexible leads, to circuitry by which the functions to be controlled by signals from such contacts, are thus properly controlled.

Conveniently the means to drive the rock shaft and the arm during time counting intervals, comprises a constant speed motor, together with gear or friction wheel drive connections from such motor to the rock shaft. By using a friction wheel drive in such connections, it is possible to effect clutching and unclutching operations by slight shifts of the driven element (comprising the friction wheel mounted directly on the rock shaft, together with the rock shaft and the sweep arm), back and forth, into and out of engagement with that friction wheel which is the driver and directly connected to the motor shaft. Such slight back and forth movements, while sufficient to produce the desired engagement and disengagement operations, are not sufficient to appreciably affect the needed accuracy of the time count operations. Preferably, also, the disengagement of such clutching means comprises a spring, so that by use of a magnet to produce engagement, when such magnet is energized, disengagement of the parts will occur automatically upon de-energizing such magnet.

Conveniently the stepping switch is one which includes a ratchet connected to the rotatably mounted element which carries the sweep contacts of the stepping switch, together with a hold-back pawl element engaging such ratchet to prevent any backward movement thereof. Since the time counting operation may be controlled for any number of steps of the stepping switch corresponding to the zone of the called station, and also corresponding to the amount of extra time for which pre-payment is made, it is clear that, upon completion of any call such stepping switch may be, and probably will be, at a position other than the zero or starting position of such switch. Accordingly, I have made provision for restoring such switch to its starting or base or zero position at completion of each calling operation by a self-energizing pulse operation of the switch, which may be termed a "buzzer" operation. This buzzer operation will commence at completion of the call, and will continue until such stepping switch has rotated its sweep contact carrying element around to the zero position, whereupon another switch of the circuitry will be opened to terminate such self-pulsing operations. This will leave the switch at its zero or home position, ready to commence operations corresponding to insertion of pre-pay coins for a succeeding operation of calling.

In connection with the foregoing provision for return of the stepping switch to its zero or home position. I have also made provision for releasing the clutch at completion of such switch returning movement, to thus permit return of the sweep arm and rock shaft to its zero or home position, preparatory to use of such elements during a succeeding calling operation.

Referring now to FIGURES 1 to 12, inclusive, the following description of the timer unit thus described in general terms is provided:

A contact suppporting plate 148 of insulating material carries the three sets of stationary contacts 149, 150 and 151, for the twenty-five cent zone, the twenty cent zone, and the fifteen cent zone, respectively. These sets of contacts are included in circular arcs drawn about a center of the plate 148, which center is defined by the opening 152, shown in the various of the figures. The rock shaft 153 extends through such opening, the opening being of larger size than such rock shaft to accommodate slight lateral displacements of the shaft (and the sweep arm 154 secured thereto) during the clutching and unclutching operations, presently to be described. An adjustable stop 155 in the form of a stud threaded through a bracket 156 supported by the plate 148, limits the returning movement of the sweep arm and the rock shaft at the zero or home position of said parts, being the zero time position from which time of the completed call is to be measured. It is here noted that such sweep arm and rock shaft are shown at their home positions in various of the figures; and that time is counted by counterclockwise rock of said parts when viewed as in FIGURE 1, as shown by the arrow.

Figure 1:
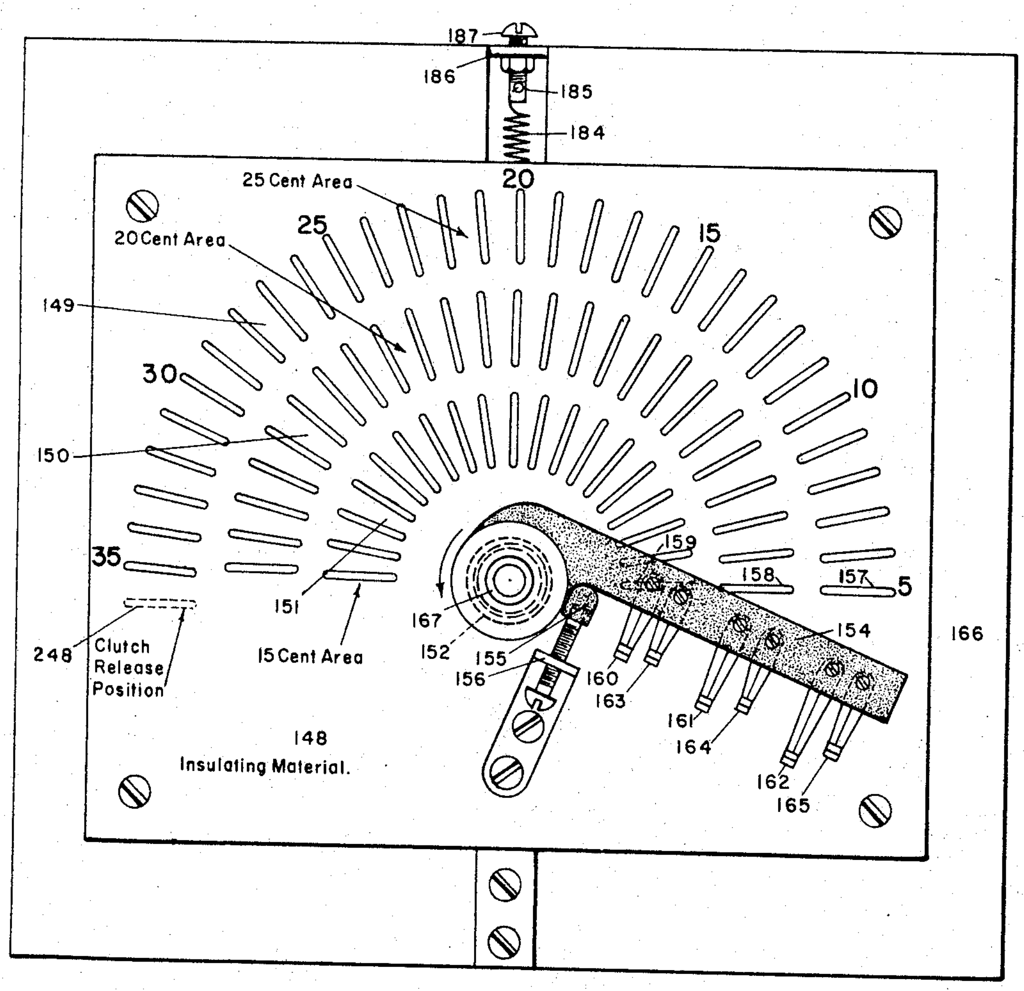

It is also seen from examination of FIGURE 1 that the first one of each of the sets of stationary contacts 149, 150 and 151, being the starting contacts 157, 158 and 159, respectively, are all located at a position somewhat above (in FIGURE 1), the illustrated home position of the sweep arm. Such sweep arm carries the primary contact elements 160, 161 and 162, corresponding to the stationary contact groups 149, 150 and 151, respectively, and also carries the secondary contact elements 163, 164 and 165, also corresponding to the stationary contact groups 149, 150 and 151, respectively. These primary and secondary contacts extend down (towards the surface of the plate 148) and at an angle, so that as the sweep arm moves during its time counting and returning movements, a good engagement of each of such contacts 160 to 165 is produced against the stationary contacts to be thereby engaged. It is now noted that all of the stationary contacts lying at the right-hand or beginning position in FIGURE 1, and there designated by the digit "5" (minutes), are aligned substantially on a radial line from the axis of rotation. Also, that all three of the secondary contacts are of such lengths and so aligned that they will simultaneously engage with such just mentioned contacts of the three groups, 149, 150 and 151, as the sweep arm reaches its position produced by lapse of 4¼ minutes from start, all of such stationary contacts engage such first stationary contacts of the three groups simultaneously. It is also seen that all three of the primary contacts are of such lengths and so aligned that they will simultaneously engage with such just mentioned contacts of the three groups 149, 150 and 151, at the time the sweep arm reaches its 5 minute position, counting time lapse from the start of the operations.

The contacts 163, 164 and 165, secondary contacts, are connected by flexible leads to the circuitry exterior to the timer, in such manner that engagement of that one of such secondary contacts which corresponds to the zone which includes the called station, and for which the base pre-pay has been made, engages such first or five minute contact, a warning signal is given to the caller, signifying that the originally pre-paid time of five minues is approaching termination. At conclusion of the five minute interval, the primary contacts 160, 161 and 162 will engage such first stationary contacts; such primary contacts being connected by flexible leads, to the circuitry, in such manner that the call will be automatically terminated, unless prepay has previously been made for extra time.

It is here noted that the warning signal must be given prior to engagement of the primary contacts 160, 161 or 162, with the next stationary contact of the series, to avoid conflict of signals emitted by the two sets of primary and secondary contacts. By using a warning signal time interval less than the time needed for the sweep arm to move the angular distance between successive stationary contacts, such conflict of signals is avoided. In the embodiment herein disclosed the warning signal is emitted forty-five seconds prior to expiration of the previously pre-paid time, whereas the time interval between successive stationary contacts of the twenty-five cent zone is established as one minute.

As the sweep arm progresses beyond the five minute position the secondary contact 165 for the twenty-five cent group of stationary contacts will engage the next stationary contact of such group, followed by engagement of the primary contact 162 with such stationary contact, such stationary contact being one minute beyond the five minute contact, or at the 6 minute elapsed time position. If a pre-pay (of one nickel) has been made prior to engagement of such primary contact 162 with such additional one minute contact, a further extra minute of the call would be permitted without interruption. If more than one nickel had been inserted into the coin receiving unit, being a multiple of five cents, the time extension would have been proportionately longer, according to the charge of five cents per minute of additional time. Thus, when the called station is in a twenty-five cent zone, the circuitry is such that proper warning and cut-off signals are produced, as needed, by engagement of the primary and secondary contacts 162 and 165 with the stationary contacts of the group 149. Although, during such twenty-five cent zone operations the primary contacts 161 and 160, and the secondary contacts 164 and 163 are successively engaging the stationary contacts of the corresponding groups still, under the conditions that the call was made to a station of a twenty-five cent zone, and pre-pay was made to meet the base pay of twenty-five cents, the outside circuitry to which the timer is connected (and portions of which outside circuitry are herein illustrated by way of illustration of one telephone system with which the present timer may be used) is such that the engagements of such other primary and secondary contacts with stationary contacts will not interfere with or affect the intended and desired operations within the twenty-five cent zone. This condition of non-interference between the circuitries for the several zones is also of importance for the following reason:

Although the time intervals between successive contacts of the twenty-five cent group 149—that is, the intervals for travel of the rock shaft and arm from contact engaging position to contact engaging position, are all of one minute each (for the twenty-five cent group) such time intervals for travel of said parts from contacting position to contacting position, for the other groups, are not one minute each; rather, for the group 150, the twenty cent group, they are one and one-quarter minute each, and for the group 151, the fifteen cent group, they are one and two-thirds minute each. Therefore, as will presently appear, the primary and secondary contacts for all of these groups do not simultaneously engage contacts of their respective groups, during a large swing of the rock shaft and arm, except at the successive five minute positions. Thus it is noted that in the case of the group 149, there are five spaces between successive five minute positions, in the case of the group 150 there are four such spaces between successive five minute contact positions, and in the case of the group 151 there are three such spaces between successive five minute positions.

Below the plate 148, and connected thereto by suitable studs, there is a second base plate 166. The rock shaft 153 is tubular and is set down into a stud 167 which has a flange 168 secured to its lower end. Such flange is secured to the face of a rock arm or bar 169. A stud 170 extends through both the rock bar 169 and the plate 166, having a flange 161 secured to its lower end, such flange being secured to the lower face of the plate 166, and constituting an ample rigid support for the stud 170 to retain it securely against shift with respect to such plate 166, and thus also to secure such stud against shift with respect to the plate 148. A thimble 172 is set over the stud and is secured to the upper face of the bar 169, as by welding. This thimble therefore serves as a bearing of the rock bar 169 with respect to the stationary plate 166, such bearing permitting slight rock of the bar with respect to the stationary parts, and thus allowing for slight displacement of the shaft 153 laterally of the hole 152 in the plate 148. Conveniently one end of such rock bar is extended through a block 173 secured to the plate 166, and slotted with a slot of sufficient length to permit the desired rock of the bar without interference. The opposite end portion of such rock bar (right-hand portion of FIGURE 2) is bent at right-angles and extends through a slot of the plate 166 to the opposite side thereof, extending thus to provide the lug 169$^a$ by which such rock bar is rocked in one direction. A stud 174 is secured to such lug 169$^a$, and a spring 175 has one end connected to such stud, and its other end connected to a bracket 176 secured to the face of the plate 166. The tension of such spring may be adjusted by adjustment of the nut 177 and the lock nut 178. A stop stud 179 set through the bracket 180 may be adjusted to limit the movement of the lug 169$^a$ in direction away from the observer of FIGURE 3.

A beveled edge friction drive wheel 181 is secured to the hollow shaft 153 to drive the same during time count. An enlarged hub 182 is secured to such hollow shaft; and a tension line 183 is wrapped partially around such hub, the end of such line being connected to the tension spring 184; the end of such spring is connected to an adjustable stud 185 extending through the bracket 186 secured to the plate 166. A nut 187 is threaded onto such stud to enable adjustment of the tension produced on the line 183. The foregoing parts are so related that the spring 184 urges rotation of the hollow shaft in direction to restore the arm 154 to its normal or home position. Drive of the beveled wheel in proper direction will rock the hollow shaft against urge of such spring 184 in the time count direction.

A small constant speed motor 188 is mounted on the lower face of the plate 166 (see FIGURE 4), such motor being shown in FIGURES 5 and 6, but due to the inversion of the unit in such figures the motor appears to be on the top face of the plate 166. This motor unit includes a built in gear reducer which drives the output shaft 189, an outboard bearing element 190 supporting the projecting end of such shaft against deflection. This output shaft carries the beveled grooved wheel 191 at constant speed during motor energization. Such grooved wheel is in position such that a slight lateral shift of the beveled wheel towards the grooved wheel will produce sufficient frictional drive from the grooved wheel to the beveled wheel to drive the shaft 153 and produce rock thereof, together with rock of the arm 154.

Examination of the so far described parts will show that the urge of the spring 175 shifts the hollow shaft 153 and connected parts, including the beveled wheel 181 in direction to carry such beveled wheel away from engagement with the grooved wheel, being the clutch disengaged position. This is the normal position of such parts.

Mounted on the plate 166 is the downwardly extending magnet element 192 (upwardly extending in FIGURES 2, 4, 5 and 6 since such figures are inverted). The armature 193 of such magnet is pivoted on the horizontally extending pin 194 set through the ears 195 and 196 of the plate 197 connected to the magnet frame 198. Energization of the solenoid 199 of such magnet will draw such armature down against a retracting force which tends to raise the armature into the position shown in various of the figures.

The lug 169$^a$ which comprises an end portion of the bar 169, is shown in FIGURES 4, 6 and 7, and others. A stem 199$^a$ extends from one side of the armature 193 to a position close to such lug 169$^a$ and close to the surface of the plate 166. To the lower end of such stem there is connected a stud 200 which aligns with and extends to the proximate edge of such lug 169$^a$. This arrangement is such that upon energization of the magnet the armature is drawn down, thus rocking such stem towards the lug 169$^a$, and forcing such lug rightwardly (when viewed as in FIGURE 6). Such rightward movement of the lug 169$^a$ results in rock of the bar 169 clockwise (when viewed as in FIGURE 7), against the tension of the spring 184, thus shifting the beveled wheel 181 into firm engagement with the grooved wheel which is driven by the motor. Immediately upon de-energization of the magnet 192 such stem 199 will be moved leftwardly by leftward movement of the lug 169$^a$, by retraction of the spring 175, with corresponding release of the bar 169 which will rock slightly counterclockwise (viewed as in FIGURE 7), to disengage the beveled wheel from the grooved wheel. Such conditions of disengagement will continue as long as the magnet is de-energized. Such disengagement of the two wheels will also permit return rock of the hollow shaft 153 and the arm 154 to their base or home position as limited by engagement of such arm with the stop 155. Thus the parts will be restored to the zero time position, preparatory to a successive time counting operation.

Conveniently mounted on the plate 166 is the stepping switch designated in its entirety by the numeral 201. Such stepping switch may be of conventional form, that switch illustrated being a product of C. P. Clare & Co., of Chicago, Ill., and illustrated in sales engineering bulletin No. 121, and there designated as type 11, Spring Driven Stepping Switch. Said stepping switch conventionally includes the magnet 202 of which the armature 203 is pivoted on the axis 204 for rock back and forth when viewed as in FIGURE 3. A rock arm 205 is connected to such armature and has pivoted to it the pawl element 206 by the stud 207 (see FIGURE 8). A stationary stop 208 limits rock rightward of such arm 205 and its pawl, under urge of the strong spring 209. Such spring's urge may be adjusted by adjustment of the stud 210 which is locked in adjustment by the lock nut 211. The pawl 206 is urged into engagement with a ratchet wheel 212 carried by the shaft element 213 of the movable contact carrier of the switch proper, presently to be explained, such urge being produced by the light spring 214. A light hold-back spring leaf 215 prevents retrograde movement of the ratchet wheel. The parts are so adjusted that whenever the magnet is energized the armature is drawn to the left (viewed as in FIGURE 8) far enough to let the pawl engage the next leftward tooth of the ratchet, such leftward movement being against the urge of the spring 209. As soon as de-energization of the magnet occurs, its armature is released, and the strong spring 209 forces such armature and the pawl rightwardly, thus advancing the ratchet wheel by spring action. Such rightward movement is limited by the stop 208 to ensure exactly one tooth distance of ratchet wheel advance, and during such one tooth advancement the light hold-back spring 215 receives the next ratchet wheel tooth, to now retain the parts in such advanced position.

The stepping switch illustrated in various figures is provided with three decks of stationary contacts, and with at least one movable contact corresponding to each such deck of stationary contacts. Such three decks are shown at 216, 217 and 218 in various of the figures; and such decks of stationary contacts are "stacked" firmly together into a convenient unit. Each such deck carries twelve radial and inwardly extending contacts 219 (see FIGURE 3), and such decks of contacts are moulded into a corresponding block of insulating material, with connection tips of such contacts extending radially outward for convenient connection to circuitry. The first or lowest contact 230 of each deck (viewed as in FIGURE 3) extends close to the shaft of rotation and serves as a current input medium for the sweep contact or wiper of such deck, as presently to be explained. Thus eleven contacts of each deck are available for circuitry connections of output nature. It is here noted that each group or deck of contacts (twelve in number) occupies 120 degrees of arc; but that all three of the decks are in vertical alignment.

Corresponding to the three decks are the three wipers 221, 222 and 223, spaced 120 degrees apart. As the shaft element rotates each such wiper in turn contacts the eleven stationary contacts of its deck, the twelfth stationary "contact" comprising a current input contact as already explained. Reference to FIGURE 10 shows that the shaft element includes the tubular member 213, onto which is set the insulating tube 224. Set onto such tubular member 224 are, in succession, the insulating disk 225, the metal sleeve 226, the insulating disk 227, the metal sleeve 228, the insulating disk 229, the metal sleeve 230, and the insulating disk 231. The tubular member 213 is provided with the shouldered enlargement 232 at its lower end, and a block 233 is set down onto such enlargement prior to assembling the various elements 224 to 231 onto the insulating tube and the tubular shaft element 213. After the foregoing parts have been assembled as shown in FIGURE 10, the insulating block 234 is set onto the stack, and finally the nut 235 is threaded onto the upper end of the tubular element 213, and drawn up tight. Thus, an assembly is produced which includes the three metal sleeves 226, 228 and 230, insulated from each other and from exterior conducting parts. The three wipers 221, 222 and 223 extend out from these three sleeves, being angularly displaced from each other, as indicated in FIGURE 11.

The three input contacts for the three decks of contacts are designated 236, 236$^a$ and 236$^b$, and are shown by the arrows thus numbered in FIGURE 10. The arrangement of such stepping switch is thus such that, during the first third rotation of the wiper unit the stationary contacts, eleven in number, of the top deck are electrified (through input from the brush 236), during the second third rotation of the wiper unit the stationary contacts, eleven in number, of the middle deck are electrified (through input from the brush 236$^a$), and during the third portion of the rotation of the wiper unit the stationary contacts, eleven in number, of the bottom deck are electrified (through input from the brush 236$^b$). Thus at completion of the full 360 degrees of rotation of the wiper unit, all of the stationary contacts, 33 in number, of the three decks, have been successively electrified and then de-electrified by passage of the wiper in question to the next stationary contact; and such wiper unit has returned to its base or home position, preparatory to a later operation.

The block 233 of FIGURE 10 may be the ratchet wheel 212 of FIGURE 8, or connected directly thereto. Thus, delivery of successive pulses to magnet 202 will produce successive advances of the wiper unit, corresponding to successive teeth of the ratchet.

Figure 3:
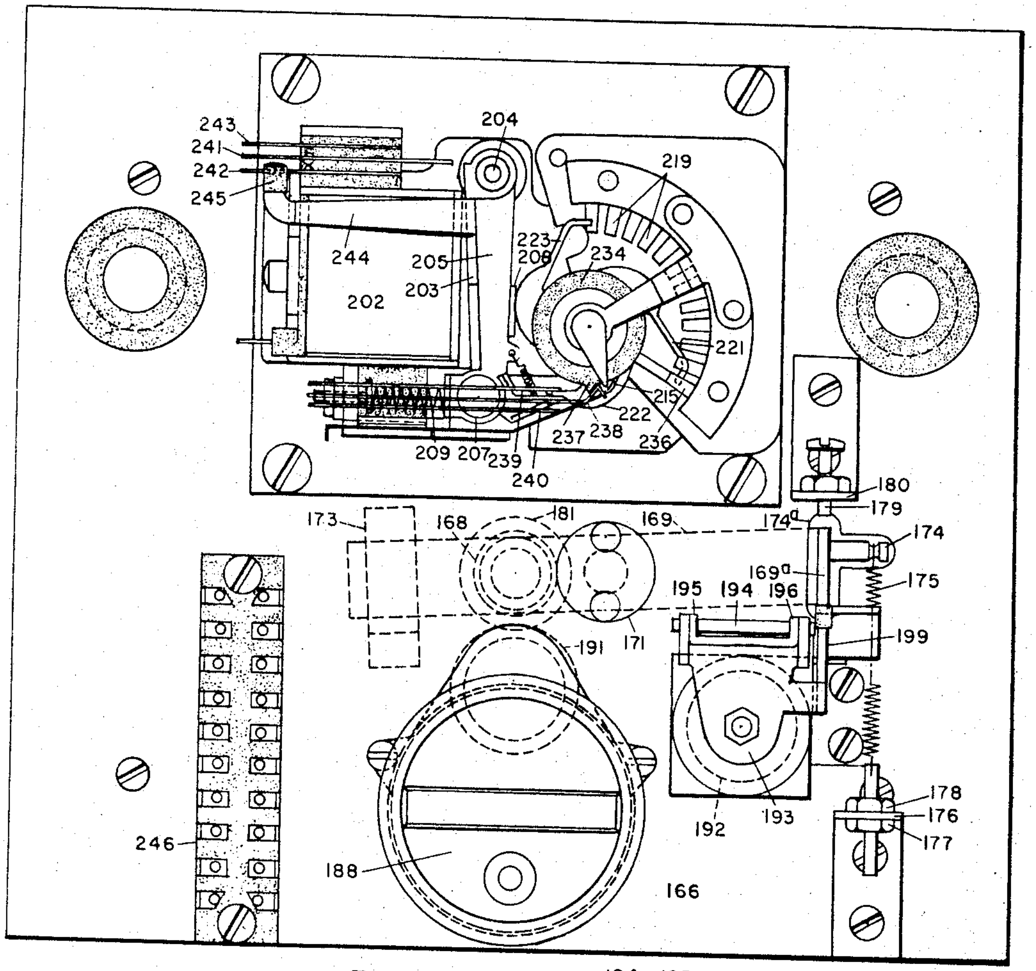

The block 234 of FIGURE 10, is provided with a single high point 237 (see FIGURE 3), and such high point is shown in FIGURE 3 as standing at the base or home position of the wiper unit. The leaf spring contacts 238 and companion stationary contacts 239 and 240 at the sides of such spring leaf contact, are supported by suitable insulating block elements in position adjacent to the wiper unit. Such support is at location such that the high point 237 will engage the free end of the contact 238 just as the home position of the wiper unit is attained, thus forcing such contact 238 outwardly into engagement with the contact 240, and away from the contact 239 with which such contact 238 was formerly engaged, during the rotational advances of the wiper unit. These contacts comprise portions of the circuitry, presently to be described; and the movement of the wiper unit to its home position, with reversal of such spring leaf contact will produce signals to terminate certain operations of the equipment with which the present timer unit may be combined.

Another spring leaf contact 241 is supported by insulation means between the two stationary contacts 242 and 243 (see FIGURE 3), being normally in engagement with the contact 242. The armature 203 of the magnet 202 is connected to an extension 244 which reaches to a point close to such spring leaf contact 241, such extension being provided with an insulating terminal stud 245 which engages such spring leaf contact. This arrangement is such that while the magnet is un-energized such stud 245 releases the spring leaf contact to allow the same to retain its normal position of engagement with the stationary contact 242; but each time the magnet is energized, with corresponding shift of its armature, such arm is also shifted to move the spring leaf contact away from such contact 242 and into engagement with the contact 243. The circuitry is provided with means, including these contacts such that, after a time counting operation has been concluded and the units, including the stepping switch 201 are to be brought to their base or home positions, a circuit is produced which includes both the contacts 238 and 239, and contacts 241 and 242, such that a pulsing operation is automatically produced, delivering successive pulses to the magnet 202 for a series of rapid advances of the wiper unit until such unit reaches its base or home position. Thereupon, such pulse delivering circuit will be opened by the shifting of the leaf contact 238 away from the contact 239, with the stepping unit in its home position. In connection with this operation it will be understood that for any completed circuitry operation the stepping switch will have been advanced at least to the five minute position; and in case of payment for excess time intervals, to a further position, not to exceed a total of thirty-five minutes. In any case, however, some further rotary advancing of such wiper unit will be necessary to bring it to its base or home position, and such further advancing will be produced, under proper control, by means of the self-pulsing operations just explained.

In various of the figures I have shown a connecting strip 246 supported by the plate 166. This connecting strip may be used as a convenient means for effecting connections between various of the terminals of electric elements of the timer unit, either to other terminals of such unit, or to terminals of other units of the circuitry with which the present timer unit may be connected.

Reference is now made to FIGURE 12 which shows the connections of the contacts of the timer to each other, and to directly related components of the timer unit. In this figure the contacts 219 are shown, for the three decks, alongside of each other in developed form. The stationary contacts for each deck are shown within a circular arc embracing 120 degrees; and the three wipers 221, 222 and 223 are shown extending radially outwardly from the wiper shaft rings 230, 228, and 226, respectively. The input contacts or brushes to such rings are shown at 236, 236$^a$ and 236$^b$. The wiper shaft is shown at its base or home position. Rotation will be in the direction shown by the arrows. Under these conditions, the following sequence of wiper engagement with such stationary contacts (corresponding to successive pulses delivered to the magnet 202), will occur; first, the successive contacts 219 of deck No. 1 (lower deck) will be engaged by the wiper 221, thus successively engaging 11 of the contacts 219, and, as such wiper leaves such eleventh contact it has advanced through 120 degrees of movement. On the next received pulse to the magnet 202, the wiper 222 for the middle deck, No. 2, will engage the first one of the series of eleven contacts of the middle deck; and successive pulses to the magnet 202 will advance such wiper successively to the eleven contacts of its deck. Likewise the next pulse to such magnet will bring the wiper 223 into engagement with the first (lowermost) contact of deck No. 3, with successive pulses advancing such wiper until the eleventh contact of deck No. 3 has been engaged. The next pulse will return the parts to their base or home position, it being noted that a number, probably most, of the pulses will be produced by the self-pulsing operation, depending on how many extra coins (of nickel denomination) have been inserted into the coin receiving unit, for extra time. At conclusion of the above operations the cut-off of pulsing will occur.

It is here noted that all of the input brushes 236, 236$^a$ and 236$^b$ are connected together by the strap line 247, to which input current is supplied by the circuitry with which the timer may be connected.

Next it remains to disclose how the stationary contacts 219 of the decks are connected to the stationary contacts 149, 150 and 151 of the timer, shown in FIGURE 1, and in the development of FIGURE 12. First, I will explain that each of the stepping switch contacts 219 of the three decks corresponds to the pre-payment of a specified total amount of money. Thus, the base contacts 157, 158 and 159, of FIGURES 1 and 12, correspond to pre-payments of twenty-five cents, twenty cents, and fifteen cents, respectively, depending on the zone to which call is being made. Also, that each step of the stepping switch from such initial position, is made upon deposit of a specified coin, such as a nickel, to enable extension of the call time beyond such prepaid interval by a time interval depending on which zone is being called. It has already been shown that each additional nickel entitles the caller to one additional minute for a call to the twenty-five cent zone, that each such additional nickel entitles the caller to one and one-quarter minutes additional time for a call to the twenty cent zone, and entitles a caller to one and two-thirds minutes additional time for a call to the fifteen cent zone. But the time counting arm 154 advances at uniform speed during timing of the call in any such case. Accordingly, the contacts of the three groups, 149, 150 and 151, which correspond to the twenty-five cent zone, to the twenty cent zone, and to the fifteen cent zone, respectively, are connected to the successive contacts 219 of the stepping switch in the manner shown in FIGURE 12. Thus, the first contact 219 (at the bottom of the deck No. 1 series in FIGURE 12), connects straight over to the 5 minute contacts of all three groups, 149, 150 and 151, since the base times for all the zones are assumed to be 5 minutes in each case. Then, the next stepping switch contact 219 of the series, connects across to the 6 minute contact of the group 149, to the 6¼ minute contact of the group 150, and to the 6⅔ minute contact of the group 151; then the next contact of the stepping switch series 219 connects across to the 7 minute contact of the 149 group, twenty-five cent group, to the 7½ minute contact of the group 150, twenty cent group, and to the 8⅓ minute contact of the group 151, fifteen cent group. Accordingly, if the caller's call is to, say, the fifteen cent group, he shall be entitled to 3⅓ minutes extension of time by extra payment of two nickels or a dime. Thus, in such case cut-off will not occur until a total time lapse of 8⅓ minutes has occurred, including the original payment, plus the extra time payment or payments.

It is not deemed necessary to describe the further connections between the various contact groups shown in FIGURE 12, as the principle on which the unit operates will now be evident.

The circuitry with which the timer may be used may include units or components connected to the several warning signal brushes 163, 164 and 165, for the three zones, so that as soon as the warning signal brush which corresponds to the zone which was called comes into engagement with that contact 157, 158 and 159, or 149, 150 or 151, for such zone, which contact is at the time electrified by the stepping switch operation, a signal will be passed to the warning element (such as a lamp), to give the desired warning at the pre-determined time interval, such as forty-five seconds, prior to expiration of such prepaid time interval. This allows the caller ample time to make a further pre-payment, should he desire to do so.

If no extra pre-payment has been made by the time the brush 160, 161 or 162, as the case may be, comes into engagement with such so-electrified contact of the group 157, 158 or 159, or 149, 150 or 151, being the final cut-off brush for the zone then in use, a signal will be given through such brush, to discontinue the operation which is under control, such as cutting off the called station, and returning various components to their base or home conditions, preparatory to a subsequent series of operations to be controlled by the timer.

When such cut-off occurs the circuitry will be altered to deliver a signal to the proper element to terminate energization of the magnet 192, thus permitting unclutching of the drive to the rock shaft 153, and permitting return of that shaft and the arm 154 to their base or home positions. These operations include the following:

A special contact 248, shown by dotted lines in FIGURE 1, and also shown in FIGURE 9, is located just beyond the high time count position of the timer unit, connected to the high point contact 463 of the stepping switch, deck No. 3, by a lead 249 and a lead 250, is carried from such high point contact 248 to the coil of a "Clutch Release Relay," 251, so that such relay is activated at the high point step of the stepping switch. (If desired, such special contact 248 of the timer unit and such line 249 may be eliminated, and connection made directly from the high point contact of the stepping switch to such relay coil, this arrangement being indicated by the dotted line 252 in FIGURE 12 connecting such high point contact of the stepping switch directly to such relay coil.) In either case, when the stepping switch attains its high point, just before cut-off of such switch, such high point generally being attained by the self-pulsing operations already referred to, the clutch relay will be activated, to discontinue the clutching operations by release of such clutch, thus permitting the rock shaft and arm 154 of the timer to be returned to their base or home positions by urge of the spring 184. In connection with the foregoing operation it is noted that in the relationship of element shown in FIGURE 12, the high time count position of the parts (including the high pre-pay position of the stepping switch) is attained prior to use of all of the steps of such stepping switch which are available. Thus there remains at least one of the high stepping switch positions available for production of the foregoing operation.

To better understand the relationship of various of the structures previously described, and one form of installation of calling station which includes the present timer, reference may be had to FIGURES 13, 14 and 15 which show a wiring diagram for a pre-pay, time control, plural zone control calling station. Since much of the detailed wiring diagram shown in these figures is not needed, for an understanding of the timer operations. I shall as far as possible refer only to those portions of such diagram as directly concern the timer operations, as follows:

Since the motor 188 is normally non-energized, and the motor clutch is also normally non-engaged, with the rock shaft and the arm 154 normally at their zero or home positions, it is necessary to make provision for starting the motor operation and for engaging the clutch, when the called party answers the call. These operations are produced as follows; the raising of the receiver of the called party reverses the polarized relay 391 (see FIGURE 14). This brings the tongue of such polarized relay against the left-hand contact 393 of such relay, where it remains as long as such reversal of the polarized relay continues. Such reversal thus energizes the relay 395 (by ground connection established through the solenoid 430 of the relay 431). Energization of the relay solenoid 395 closes the contacts 462. This grounds the line $268^g$ through the contact "*e*" of the relay 267 (such relay being then energized). Line $268^g$ is connected to line 461 by the closing of the contacts 462 (grounded as above). Such line 461 connects to one side of the timer motor 188 (see FIGURE 13). The other side of such timer motor connects to current supply for such motor through the contacts 458 of the clutch release relay 251, which relay is non-energized during the foregoing operations. Thus the timer motor is supplied with current by the raising of the called party's receiver. The lower contacts of such relay 251 are also closed during the foregoing operations. Thus the timer clutch is also energized at the same time that current is supplied to the timer motor; such energization being produced from the current supply 444, through the clutch solenoid 192, and lower closed contacts of the relay 251, to the line 460–461 which, as we have seen is connected to ground by the raising of the called party's receiver from its hook. Thus the time counting starts simultaneously with the removal of the called party's receiver from its hook.

The drive of the hollow shaft 153 and the arm 154 in the time count direction must be terminated at conclusion of the call by hanging up the called party's receiver. Such hanging up of that receiver will result in releasing the polar relay 391 to its central position (shown in FIGURE 14), thus disconnecting from the stationary contact 393 of such relay. This will open the relay 348 (unit 5, FIGURE 14) thus opening the contacts 462 of such relay, and thus disconnecting line 461 from line $268^g$ (see unit 5, FIGURE 14, and also FIGURE 13). Such line $268^g$ connects to leaf contact "*e*" of relay 271, unit 8 (FIGURE 13), being one of the set of relays designated "15 cent," "twenty cent" and "twenty-five cent" in FIGURE 13. When such relay 271 is still energized its contact "*e*" is grounded by engagement with its leaf. The line 460–461 is the return line from the timer motor. Terminating the connection of such line to ground will terminate the timer motor operation. Accordingly, either the release of the relay 348 (by returning the called party's receiver to its hook), or release of the relay 271, unit 8, by collect of the coins from the escrow unit 257 (see FIGURE 13), will cause the timer motor ground connection to be broken, thus terminating further movement of the arm 154 in the time count direction.

Having terminated the time count movement of the shaft 153 and the arm 154, it remains to show how the operations are produced by which these parts will be rapidly returned to their base or home positions when the time count is completed, preparatory to the next time counting operation. Such operations and the necessary connections therefor, are as follows:

Return of the shaft and the arm cannot be produced except when unclutching is produced. The spring 175 (see FIGURE 6) normally retains the clutch in unclutched position. Clutching is produced by energization of the solenoid 192. Accordingly, provision is made for energizing such solenoid only during time counting; at all other times the parts are unclutched by the operation of the spring 175.

The return of the shaft 153 and arm 154 to their base or home position does not concurrently produce return of the stepping switch wipers to their base position, since their position at conclusion of the call was produced by pulsing their wipers to the positions which they occupied at the time of terminaton of the call. All advances of such wipers are produced by the pulses delivered to the stepping switch elements quite independently of the motor drive to the arm 154. Furthermore, at conclusson of the call the wipers will occupy rotated positions corresponding to the number of pulses delivered to the stepping switch, and corresponding to the number of coin values of one nickel each, which have produced such pulses. Also, at conclusion of the call it becomes necessary to make provision to return the wipers to their base or home position automatically, and at such speed as will ensure that they occupy such base position before a succeeding call may be instituted. During such return of the wipers to their base or home position they should be un-electrified to avoid delivery of false signals as the wipers sweep over successive contacts 149, 150 and 151 during progress of the wipers to their base positions; it being noted that to attain their base positions the wipers travel in the same rotary direction as during their stepping advances corresponding to coins inserted into the coin receptacles. Such rotary advance for return to the base position is produced by self-produced stepping impulses, acting on the ratchet wheel already referred to. The following explanation of the returning operations is now in order:

The return of the called party's receiver to its hook produces reversal of the polar relay 391, bringing the tongue 392 of that relay against the left-hand contact 393. This operation activates the relay 348 over the line 394–437 (see FIGURE 14). Relay 348, thus activated closes, among others, its contacts 442. Current for pulsing the stepping magnet of the timer, shown at 443 (FIGURE 12), is supplied by the input connection 444 over the line 445. The opposite terminal of the stepping unit pulser connects by the line 446 with one of the contacts 442 just referred to. The other one of the contacts 442 connects by the line 447 with one of the contacts 448 of the relay 449 (see unit 24, FIGURE 14) and the other one of such contacts 448 is grounded. Activation of such relay 449 is produced by electrification of its magnet coil 450. One terminal of such coil connects by the line 451 with one of the contacts 452 of the relay 453, which relay contacts 452 are normally closed as shown in FIGURE 14. Thus activation of the relay 453 opens such contacts 452, thus releasing the relay 449, and removing the ground from the line 447. The initial pulse was delivered when the tongue 392 of the polar relay was set over leftwardly, and the opening of the contacts 448 of relay 449 conditions such relay 449 for delivery of another pulse each time the relay magnet is energized by supply of a pulse to the coil 450. Such added pulse is delivered to such coil 450 corresponding to each added nickel received into the receiving unit as follows:

One terminal of the magnet coil 450 connects by the lead 454[a] to the group of switches 254, 255 and 256; such group of switches connects to 110 v. AC input 373 by the lead 374 (see FIGURE 13; and the other input 379 connects by the line 456 to the contact with which the tongue 452 of the relay 453 makes contact. Thus the energizing of the magnet coil 450 of the relay 449 is under control of the coin actuated switches as well as the relay 453. This arrangement is such that each time a nickel is received into the coin receiving equipment, the five cent switch 254 is operated to produce a pulse in the magnet coil 450, thus also producing a pulse through the circuit which includes the timer stepping switch elements. Accordingly, by inserting nickels from time to time (or dimes or quarters, each of which produces a number of pulses corresponding to the value of such higher denominations coin than five cents, such number of pulses equaling the number of nickels equivalent to such coin of higher denomination) these added pulses serve to advance the wipers of the stepping switch one contact of such switch corresponding to each added nickel of value. The result of such operations is a corresponding increase of the time during which the conversation may be continued without cut-off being automatically produced. Such pulses thus produced by the insertion of extra coins for extra time, do not affect the positions of the selectors shown in FIGURE 15; and the selectors retain their dialed positions until cut-off finally occurs.

Next it is proper to show how the termination of the time counting operation by termination of current supply to the motor 188 and concurrent release of the clutch, and return of the shaft and the arm 154 to base or home positions, also concurrently produces return of the stepping switch to its base or home position, all preparatory to proper production of a subsequent operation. These operations of return of the stepping switch to its base or home position are produced as follows:

A line 466 (see FIGURE 13) connects the stationary contact 240 of the "Off-Normal" switch of the stepping switch, to the stationary contact of the pair of contacts 467 of relay 348 (unit 5, FIGURE 14). The tongue of such pair is grounded. Accordingly, when the polar relay is released (by return of the called party's receiver to its hook), and with consequent movement of the tongue 392 of the polar relay to its central position, and separation of such tongue from the left-hand contact 393, the magnet 395 of relay 348 (unit 5) is de-energized. Then, after a slight delay, produced by the capacitor 472 the tongue of such pair 467 will engage its stationary contact to ground the line 466. Thereupon the tongue 241 of the interrupter of the timer stepping switch (unit 22, FIGURE 13) will be grounded (the "Off-Normal" contacts 238–240 being in their contacting position). At once self-pulsing will commence and will continue until the high point 237 which controls the leaf contact 238, comes to its base or home position (see FIGURE 3). Thereupon such leaf contact 238 will be separated from its companion stationary contact 239 and into re-engagement with the other stationary contact 240. Thus the attainment of the base or home position will terminate the self-pulsing of the stepping switch at its home position, preparatory to commencement of a subsequent time counting operation.

I have already shown how hanging up the called party's receiver will cause disengagement of the clutch and termination of current supply to the motor, with concurrent return of the shaft and the arm 154 to their base or home positions. It is, however, possible that the call for which pre-pay was originally made, plus numerous extensions by further deposits of coins, may be sufficient to carry the shaft and the arm 154 to a high position greater than permitted by the physical limits of the timer unit. Such physical limits include the maximum number of steps for which the stepping switch is designed and constructed, being 33 in the illustrated embodiment. In such case the timer would not be returned to its base or home position by such re-placing of the called party's receiver on its hook, and the movable parts, including the arm 154 and the shaft, would become jammed, with the motor still under current drive. Such a condition might, in some cases be produced by failure of the called party to replace his receiver on its hook. To meet this contingency, and for other reasons I have made the following further provisions for returning the shaft and the arm, as well as the stepping switch, to their base or home positions when such a condition may exist as just described, as follows:

A high point contact 248 of the stepping switch is provided (see FIGURES 12 and 13) which will be engaged by a wiper of the stepping switch. If desired a corresponding high point contact 463 of one of the groups 149, 150 or 151, whichever is located at a physically high position of the switch movement, being, in the illustrated case, the highest contact of the group 149, the twenty-five cent group, may also be provided, being connected to such contact 463 by the line 249. Accordingly, when the stepping switch has been moved to such high point, either by motor drive, or by pulsing of the switch, current from the input 457 (see FIGURE 13) will be delivered through the normally closed contacts 458 of the relay 251 ("Clutch Release Relay"), line 459, stepping switch wiper 123, contact 463 (or contact 248), line 250 (including the diode 250a) to the solenoid 464 of the relay 251, and to ground. This will reverse such relay, with corresponding opening of the contacts 458, and 506, and closing of contacts 507. The opening of the contacts 458, thus produced, will at once discontinue energization of the solenoid 464; but a time delay is provided across such solenoid, in the form of the capacitor 465, of sufficient delay property, to ensure production of the desired functions, as follows:

Opening of contacts 506 discontinues supply of current to the clutch solenoid 192, and opening of contacts 458 ensures discontinuance of current supply to the solenoid for a delayed interval, as above explained. Such discontinuance of current supply to the solenoid, and the delay interval, are sufficient to ensure clutch release for an interval sufficient to allow complete return of the shaft and the arm 154 to their base or home positions, under urge of the spring 184, and to ensure that when such delay has expired, with restoration of the contacts of such relay 251 to their normal, unactivated position, other circuits will be restored to such condition as to provide for the succeeding operations, already described.

It is noted that various of the interconnections between elements of the timer may be in the form of permanent leads from one such element to another or other elements of the timer proper; such interconnections need no outside connections for transfer of the signals between such elements to ensure proper functioning of the so-connected timer elements. Other interconnections include portions of the circuitry shown in the wiring diagrams of FIGURES 13, 14 and 15. Nevertheless, when the timer unit is used for its intended purposes, and to produce the intended functions described hereinbefore, as a portion of the complete ensemble of a different telephone calling station, or other installation, it is evident that the ancillary connections herein produced by the complete calling station, may be comparably provided by connections comprising portions of such different telephone station for performing the functions hereinbefore described, or other functions within the capabilities of the timer unit itself.

I claim:

1. In a timer, the combination of a stationary contact carrier, a plurality of groups of contacts spaced apart along parallel paths of movement of a wiper carrier, a first defined wiper carrier, means to support said first defined wiper carrier for movement along a path parallel to the paths of the stationary contacts aforesaid, means to move said first defined wiper carrier along its path of movement at uniform speed; a group contact wiper for each group of contacts, carried by said first defined wiper carrier in position for successive engagement with the contacts of the corresponding group during the travel of the first defined wiper carrier at said uniform rate; wherein the contacts of each group are spaced equally along the path of such group at spacings proportional to the base charge rate for which such group of stationary contacts corresponds, and wherein the base charge rates corresponding to each group of contacts, is different from the base charge rates for the other groups of said contacts; together with a group cross connection between each successive stationary contact of a group, and the corresponding successive stationary contacts of the other groups; output stationary signal delivery contacts in connection with such group connections, and lying in a path parallel to the stationary contact paths of the groups of contacts, and means to advance such output wiper synchronously with the movement of the first defined wiper carrier, for engagement of such output wiper with each output stationary contact, simultaneously with engagement of the group contact wipers with group contacts corresponding to such output stationary contact.

2. A timer as defined in claim 1, wherein the means to support the carrier comprises a carrier shaft constituted for carrier travel in a circular arc, and wherein the group paths of the groups of contacts comprise circular arcs substantially co-axial with the carrier shaft.

3. A timer as defined in claim 2, wherein the contact groups are located at successively greater radii from the pivotal support axis of the carrier shaft, and wherein the carrier extends outwardly from the carrier shaft in a substantially radial direction; and wherein the angular spacings of the successive contacts of each group from each other are smaller in the groups of which the paths are located at the greater radii than are the angular spacings of the successive contacts of the groups of smaller radii.

4. A timer as defined in claim 2, together with a support for the shaft, said support including a laterally shiftable bar, said clutching means including companion friction wheels on the shaft and the motor output shaft constituted for friction drive from the motor to the shaft under lateral shift of the bar in one direction, magnet means in connection with the laterally shiftable bar constituted to shift the bar in direction to produce frictional engagement of the friction wheels for drive of the shaft under motor energization, wherein the unclutching urge means comprises spring means in connection with the bar urging shift of the bar in direction to produce unclutching.

5. A timer as defined in claim 2, together with means to progressively electrify successive contacts of the groups, comprising switch means having successively located output terminals, means to electrify said terminals in a pre-determined progress between a starting position terminal electrified position and a final terminal electrified position, together with connections between said terminals and selected contacts of the groups of contacts.

6. A timer as defined in claim 5, wherein the connections between the selected contacts of the groups of contacts comprise connections between progressively successive contacts of each group of the contacts commencing at a starting position of the contacts of all of the groups.

7. A timer unit comprising in combination, a plurality of groups of stationary contacts, the contacts of each group being spaced apart by equal distances, and the spacing distances of the several groups being different from each other; wherein the successive contacts of each group commencing at a starting position of such group, may be designated as the first contact of such group, the second contact of such group to the $n$th contact of such group; connections joining together all of the first contacts of the several groups, and joining together all of the second contacts of the several groups, and joining together the successive contacts of the several groups up to the $n$th contacts of such several groups; wherein the contacts of each group lie in a common path with the paths of all of the groups substantially parallel to each other; a wiper carrier, means to mount said carrier for movement along a path substantially parallel to the paths of the several groups of contacts, means to drive said carrier along its path at substantially uniform speed, wipers mounted on said carrier in position for successive engagement with the successive contacts of the several groups, output terminals from said wipers; and means to electrify the connections which join contacts of the several groups together, in the order of progress of said joining connections from the first contacts joining connection, progressively to the *n*th contacts joining connection.

8. A timer unit as defined in claim 7, wherein the means which electrifies the connections which join contacts of the several groups together, comprises stepping switch means including a plurality of output terminals, means to successively electrify said output terminals according to successive pulses delivered to the stepping switch, and connections from such output terminals of the stepping switch means, to the connections which join together contacts of the several groups.

9. A timer unit as defined in claim 8, together with first defined means to deliver first defined pulses to the stepping switch; and second defined means to deliver second defined pulses to the stepping switch; said second defined pulses delivering means being constituted to deliver successive pulses to the stepping switch under stepping switch pulse delivering control.

10. A timer unit as defined in claim 9; together with means to activate the second defined pulse delivering means, and means to discontinue such activation at a pre-determined position of the stepping switch.

11. A timer unit as defined in claim 10, wherein the means which successively electrifies the output terminals of the stepping switch means, comprises a rotary contact carrier journalled for rotation about an axis from a starting position to terminus at such starting position; and wherein such starting position of such rotary contact carrier is the position of such rotary contact carrier a predetermined angular distance in advance of the position of said rotary contact carrier for electrification of the joining connection of the first contacts of the several groups.

References Cited

UNITED STATES PATENTS 2,937,246 5/1960 Bothwell ------------ 200—37

FOREIGN PATENTS 240,198 4/1924 Great Britain.

BERNARD A. GILHEANY, *Primary Examiner.*

G. J. MAIER, H. E. SPRINGBORN, *Assistant Examiners.*